(12) United States Patent
Alves

(10) Patent No.: US 10,427,364 B2
(45) Date of Patent: Oct. 1, 2019

(54) SMOOTHING OF A SURFACE OF AN ARTICLE FORMED FROM A PLASTIC

(71) Applicant: Ford Global Technologies, LLC, Dearborn, MI (US)

(72) Inventor: Bruno Alves, Huerth (DE)

(73) Assignee: Ford Global Technologies, LLC, Dearborn, MI (US)

(*) Notice: Subject to any disclaimer, the term of this patent is extended or adjusted under 35 U.S.C. 154(b) by 131 days.

(21) Appl. No.: 15/866,391

(22) Filed: Jan. 9, 2018

(65) Prior Publication Data
US 2018/0194086 A1 Jul. 12, 2018

(30) Foreign Application Priority Data
Jan. 9, 2017 (DE) .................. 10 2017 200 191

(51) Int. Cl.
| | | |
|---|---|---|
| B29C 37/00 | (2006.01) | |
| B29C 71/00 | (2006.01) | |
| B05D 7/02 | (2006.01) | |
| C08J 7/02 | (2006.01) | |
| B05D 5/00 | (2006.01) | |
| B05D 3/10 | (2006.01) | |

(52) U.S. Cl.
CPC .............. *B29C 71/009* (2013.01); *B05D 5/00* (2013.01); *B05D 7/02* (2013.01); *C08J 7/02* (2013.01); *B05D 3/107* (2013.01); *B29C 71/0009* (2013.01)

(58) Field of Classification Search
CPC ......... B33Y 80/00; B33Y 30/00; B33Y 40/00; B33Y 50/00; B29C 71/0009; B29C 64/393; B29C 37/0025; A61L 27/50
See application file for complete search history.

(56) References Cited

U.S. PATENT DOCUMENTS

| | | | |
|---|---|---|---|
| 3,020,661 | A | 2/1962 | Miller et al. |
| 4,302,418 | A * | 11/1981 | Cullis ...................... B05D 3/10 264/341 |
| 2005/0173838 | A1 | 8/2005 | Priedeman, Jr. et al. |
| 2011/0076417 | A1 * | 3/2011 | Matsuda ................. C23C 18/06 427/532 |
| 2014/0264294 | A1 | 9/2014 | Holman et al. |
| 2015/0165675 | A1 | 6/2015 | Dawson et al. |

(Continued)

FOREIGN PATENT DOCUMENTS

| | | |
|---|---|---|
| CN | 103192524 | 7/2013 |
| CN | 204526140 | 8/2015 |

(Continued)

*Primary Examiner* — Gregory A Wilson
(74) *Attorney, Agent, or Firm* — Burris Law, PLLC

(57) ABSTRACT

A device and method for smoothing a surface of an article formed at least partially from plastic, in particular a component of a motor vehicle, is provided. The method includes arranging the article in a vacuum-tight chamber, reducing the pressure in the chamber to a partial vacuum of not more than 50 kPa, in particular not more than 34 kPa, and admitting acetone into the chamber. Some of the acetone is vaporized and the vapor is precipitated on the surface of the article. In one form, the precipitated vapor acts on the article for at least 1 minute. The method further includes opening the chamber, so that at least the ambient pressure prevails in the chamber and removing the article from the chamber.

20 Claims, 2 Drawing Sheets

(56) References Cited

U.S. PATENT DOCUMENTS

Figure 1:
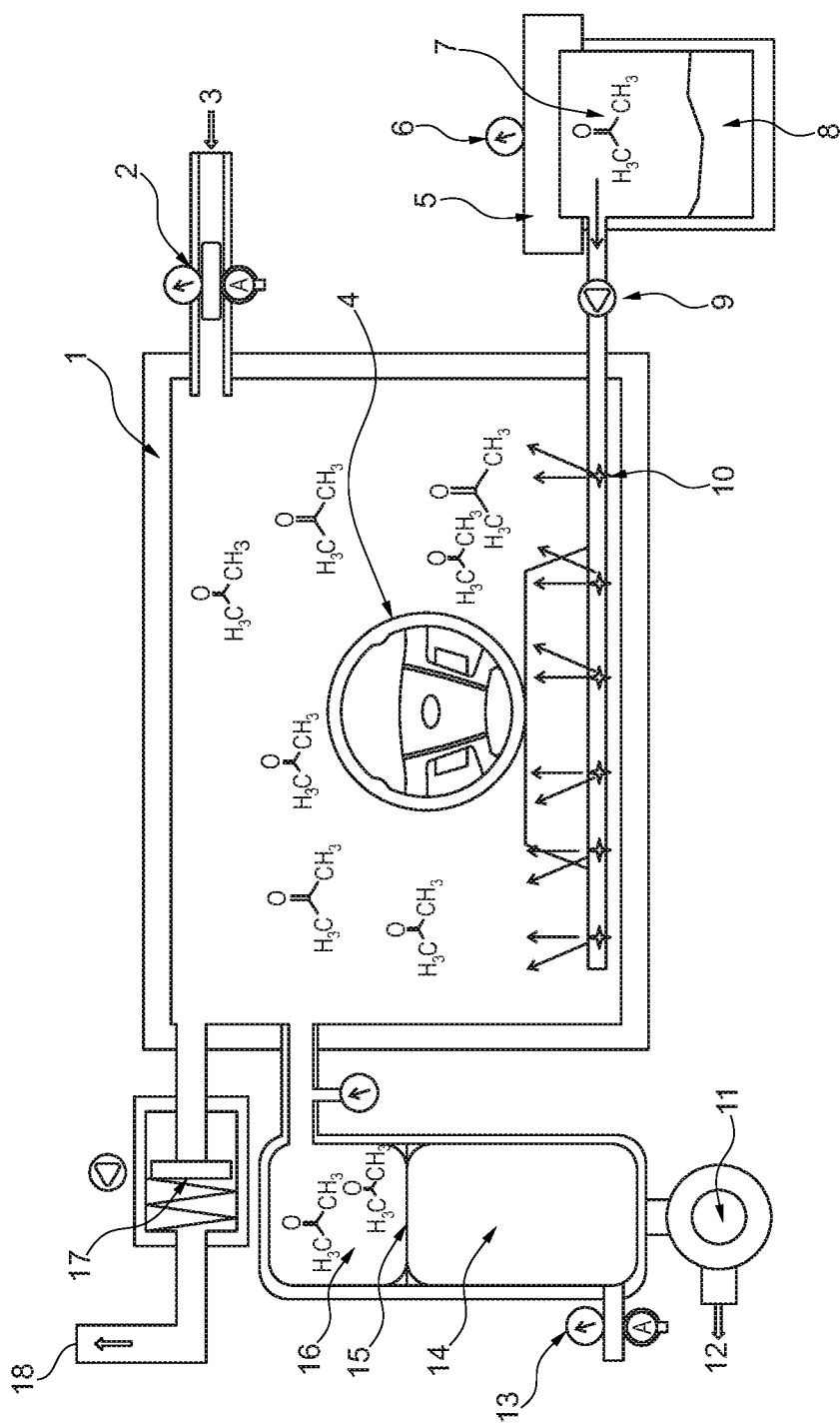

| | | | |
|---|---|---|---|
| 2016/0108522 A1* | 4/2016 | Donovan | B33Y 40/00 427/248.1 |
| 2019/0151886 A1* | 5/2019 | Luo | B29C 71/0009 |
| 2019/0176393 A1* | 6/2019 | Broady | B29C 64/245 |

FOREIGN PATENT DOCUMENTS

| | | |
|---|---|---|
| DE | 112014002879 | 4/2016 |
| JP | H05239240 | 9/1993 |

\* cited by examiner

SMOOTHING OF A SURFACE OF AN ARTICLE FORMED FROM A PLASTIC

CROSS-REFERENCE TO RELATED APPLICATIONS

This application claims priority to and the benefit of German Application Number 102017200191.7 filed on Jan. 9, 2017. The disclosure of the above application is incorporated herein by reference.

FIELD

The present disclosure relates to a method for smoothing a polymer surface of an article, in particular an article for a motor vehicle, which is produced by an additive manufacturing process, for example, to a device suitable for this method and to an article processed according to this method. Smoothing of the surface reduces an originally excessive surface roughness to a value which is similar to an article produced by injection molding.

BACKGROUND

The statements in this section merely provide background information related to the present disclosure and may not constitute prior art.

For example, spare parts that are no longer so easy to find on the market are often needed for motor vehicles. A typical example of this is the case of spare parts for classic cars. The injection molds from which the articles were earlier produced frequently no longer exist. The shape of the articles is generally known, however; it can be determined by scanning or other methods, particularly if there is an old, possibly also no longer serviceable article to hand. Once the shape is known it is possible to produce the article by 3-dimensional printing methods. These are usually printed layer by layer. As a result the surface of the article printed in this way is decidedly too rough; it has a poor surface quality. In particular it is not smooth.

The term "article with a polymer surface" is here taken to mean that the article is composed at least partially of plastic, or more precisely at least a part of the surface is composed of plastic. It is this part which exhibits the excessive roughness that needs to be reduced. The article may have a metal core, for example, on which the plastic material is applied.

DE 11 2014 002 879 T5 discloses a method in which a liquid solvent is first applied to the surface by immersing the article in the liquid solvent, for example also acetone; this can be done at room temperature. The solvent is removed again by suction extraction, that is to say by applying a vacuum. The suction extraction is preferably performed at higher temperature in a vacuum oven. The vacuum used for this ranges from 100 to 250 Torr. 250 Torr corresponds approximately to ⅓ of the normal atmospheric pressure or approximately 33 KPa. The application of a layer of gel is also described. The gel layer is allowed to set in order to smooth at least a part of the surface whilst reducing the roughness.

U.S. Patent Application No. 2014/0264294 A1 discloses the surface treatment of articles that have been produced by the 3D method.

Acetone $C_3H_6O$ is the common name for propanone or also dimethyl ketone, the simplest ketone. Acetone is a colorless liquid and is used, among other things, as an aprotic solvent. Acetone is known to be a very good solvent. It is used for cleaning in various branches of industry. Its characteristic structural feature is the carbonyl group, which is bonded with two methyl groups. The boiling point is 56° C., the vapor pressure is 233 kPa at 20° C. In higher concentrations acetone forms an explosive mixture with air. At normal air pressure the substance ignites at approximately 56° C.

JP 000H05239240 A1 teaches a method of surface treatment. CN 103192524 A discloses a method and a device using a system of baths.

3D-printed plastic articles, which are the articles mainly involved here, can also be smoothed, for example, by sand blasting or grinding. These do not allow the treatment of constrictions, undercuts and other problem points, however, at any rate to adequate quality standards. Small details important to the article may be lost in the treatment process. The outcome depends on the skill of the person performing the treatment. Treatment can usually only be performed manually and such treatment is costly. In the treatment process often too much material is removed locally, and often too little, so that the overall quality is unsatisfactory.

Instead of sand, yet other blasting abrasives may be used, for example CO2 ice particles or other particles, such as glass beads, for example. Here similar problems arise to those described above for sand blasting.

One common method is smoothing of the surface through treatment with acetone. A distinction is made here between a cold and a hot method. It is known that acetone dissolves or at least partially dissolves a large number of plastics, for example ABS In the cold method the printed parts are put into a vessel, the bottom of which is covered with a small quantity of acetone. The vessel is closed. The acetone passes increasingly into the gaseous state and dissolves approximately 2 μm from the surface of the printed article. Such stripping by means of vaporous acetone typically takes 3 hours. Great care has to be taken to see that an explosion does not occur.

The hot method carries an even greater risk of explosion than the cold method. In the hot method heat is delivered, thereby actively bringing the acetone into the gaseous state. Temperatures of 60° C. and above are applied. The process thereby runs relatively quickly but has to be used with great caution owing to the increased risk of explosion

SUMMARY

The present disclosure provides a method, a device and a correspondingly produced article which are advantageous compared to the prior art, in which the method can be performed extremely safely but without thermal energy input, the device is of simple construction and the finished article is smooth and accurate to size.

The present disclosure provides a method for smoothing a surface of an article formed at least partially from a plastic, in particular a component of a motor vehicle, comprising the following steps:

arranging the article in a vacuum-tight chamber;

reducing the pressure in the chamber to a partial vacuum of not more than 50 kPa, in particular not more than 34 kPa;

admitting acetone into the chamber, which leads to a vaporization of at least some of the acetone; the vapor is precipitated on the surface of the article;

allowing the precipitated vapor to act on the article for at least 1 minute;

opening the chamber, so that at least the ambient pressure prevails in the chamber; and removing of the article from the chamber.

According to the present disclosure the solvent acetone is brought into the gaseous phase by working in a partial vacuum. The method according to the present disclosure is in one form performed at room temperature, a slight increase to non-critical temperature ranges, for example 30° C., is possible. In the method an article, for example a 3D-printed component, is arranged in a chamber that is sealed so that it is air-tight. In the chamber is a certain quantity of acetone. A vacuum pump serves to produce a partial vacuum, for example 33 KPa, in the sealed chamber. At the pressure specified of 33 KPa the acetone begins to boil, the acetone vapor fills the chamber and is thereby precipitated on the surface of the article. After a brief period, in particular between 1-10, and in one form 1-2 minutes, the surface is sufficiently smoothed by the gaseous acetone wetting the polymer surface. Atmospheric pressure can now be re-established in the chamber before removing the treated article.

The process in one form works in a largely closed system. The chamber is only ever opened when atmospheric pressure prevails inside the chamber. Then, however, at room temperature the acetone is substantially liquid; only a little vapor escapes when the chamber is opened.

A vacuum pump, according to one aspect, is not connected directly to the interior of the chamber, but rather its suction side is connected to an air chamber, which is connected to the chamber by way of a moveable diaphragm, a moving piston or another suitable divider. This means that the vacuum pump always only delivers air, not acetone vapor.

In an enhancement an airlock is also possible, through which the article to be treated passes into the chamber and out again. This airlock takes the form of a vacuum lock according to one form of the present disclosure. A partial vacuum can thereby be constantly maintained in the chamber.

Further areas of applicability will become apparent from the description provided herein. It should be understood that the description and specific examples are intended for purposes of illustration only and are not intended to limit the scope of the present disclosure.

DRAWINGS

Figure 2:
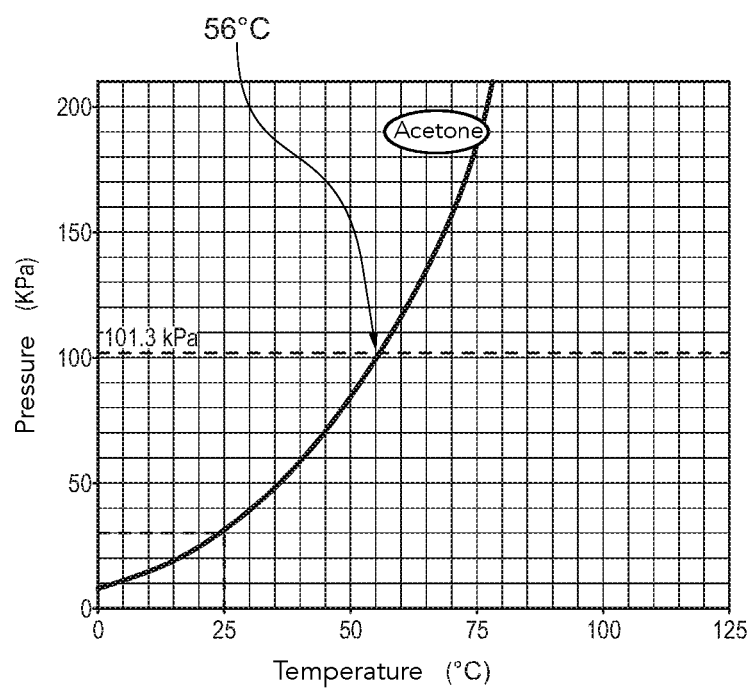

In order that the disclosure may be well understood, there will now be described various forms thereof, given by way of example, reference being made to the accompanying drawings, in which:

FIG. 1 shows a schematic representation of a device for smoothing the surface of an article, wherein the surface is at least partially composed of plastic, and FIG. 2 shows a diagram of the vapor pressure of acetone in kPa over the temperature.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a chamber 1 which can be sealed so that it is air-tight and which is connected to a piping connection, in which there is an automatic valve 2, opening and closing the path of a compressed air connection 3 into the interior of the chamber 1. It is possible via the compressed air connection 3 to introduce compressed air, for example, at a pressure ranging from more than 1 bar to 3 bar, in particular approximately 2 bar, into the chamber 1. Situated in the chamber 1 is an article 4, represented by way of example as a steering wheel. Assigned to the chamber 1 is a vessel 5, the internal pressure of which is indicated by a pressure display 6. Inside the vessel 5 are gaseous acetone 7 and liquid acetone 8. The vessel 5 is connected to the interior of the chamber 1 by way of a feed line, in which a one-way valve 9 is situated. It continues into a manifold 10, which has openings for acetone vapor to escape.

The vacuum is generated by a vacuum pump 11. It has an outlet 12 and is connected on its suction side to a working chamber, which comprises two separate sections, that is to say an air area 14 and an acetone area 16 separated by a diaphragm 15. The diaphragm 15 is designed, for example, as a rolling diaphragm. Its position inside the working chamber 14, 16 is freely variable and follows the pressure ratios. To put it another way, the internal volume of the working chamber 14, 16 is freely divisible between the air area 14 and the acetone area 16, depending on the position of the diaphragm 15. Its position in turn varies as a function of the pressures in the two areas 14 and 16. The diaphragm 15 may also take the form of a tight sealing piston or slide, which slides in a working chamber 14, 16 with cylindrical inner surface in the longitudinal direction of the cylinder and separates the two areas 14, 16 airtightly from one another. The air area 14 is connected via a length of pipe to the outside where an air outlet 13 is provided, which can also function as air inlet. The pipe area is provided with a valve.

The acetone area 16 is constantly connected to the interior of the chamber 1 via a connecting pipe. Also represented is a pressure gauge, which serves to display the pressure prevailing in the acetone area 16 and hence also inside the chamber 1.

The chamber 1 is connected to a one-way safety valve 17, which on the outlet side opens into an outlet connection 18.

The method proceeds as follows:

First an article 4 to be treated, which has a surface produced in the 3D-printing process, is arranged in the chamber 1. This can be done by opening the chamber 1, but an airlock (not shown) may also be used for this purpose. The article 4 is arranged in a favorable position inside the chamber 1, and in one form is arranged at its center. More than one article 4 may be inserted into the chamber 1. Then the chamber 1 is hermetically sealed. The air outlet 13 is closed. The automatic valve 2 is closed.

A next step is to start the vacuum pump 11. It pumps air out of the air area 14. The diaphragm 15 is thereby displaced; in the representation shown it moves downward. As a result the overall volume of the chamber 1 and acetone area 16 including its connecting pieces is sufficiently enlarged so that in this overall area and hence also inside the chamber 1 a pressure prevails which corresponds to approximately ⅓ of the atmospheric pressure. The one-way valve 9 opens due to the pressure differential that now exists.

In order to achieve an adequate enlargement of the overall volume, so that the desired partial vacuum is attained, the working chamber, which forms the air area 14 and the acetone area 16, may have a relatively large volume, at any rate significantly greater than in the schematic representation. When the internal pressure in the chamber 1 and the spaces connected thereto has been sufficiently reduced, the acetone present particularly in the vessel 5 boils. It is precipitated on the surface of the article 4 and elsewhere. In one form, the article 4 to have a lower temperature than the other internal wall parts of the overall space that forms the overall volume, particularly of the chamber 1. This is achieved in that the vapor is precipitated on the cool surface of the article 4. It is sufficient if the article is 5 to 30°, in particular 5 to 10° cooler than other internal wall parts of the overall space.

After a treatment of 1 to 2 minutes with acetone vapor the surface of the article 4 is sufficiently smoothed. The vacuum pump 11 may be switched off by this time. The article 4 is now ready for removal. The air outlet valve 13 is opened; the volume of the air area 14 is reduced again and the diaphragm 15 is displaced. In the representation it is displaced upward. In addition, the automatic valve 2 may also be opened and compressed air admitted into the interior of the chamber 1. Residual acetone vapor fractions can now leave the chamber 1 when the excess pressure opens the safety valve 17. They can be collected by suitable means at the outlet connection and reused. The chamber 1 is now largely free of acetone vapor and be opened; the finished product, that is to say the article 14, can be removed.

FIG. 2 shows the vapor pressure for acetone in KPa plotted over the temperature range of 0-125° C. At a temperature of 56° C. the vapor pressure has a value of 101.3 KPa, that is to say atmospheric pressure. The boiling point at normal pressure is thereby 56° C. At approximately room temperature (25° C.) the boiling point occurs at a pressure of 30 kPa. The method according to one form of the present disclosure is performed in a pressure range below 50 kPa, particularly below 40 kPa. A pressure below 10 kPa is possible but not desired: it is not necessary to attain such pressure values.

In the method for smoothing a surface of an article 4 formed at least partially from a plastic, in particular a component of a motor vehicle, at least the following steps are performed:

arranging the article in a vacuum-tight chamber 1;

reducing the pressure in the chamber 1 to a partial vacuum of not more than 50 kPa, in particular not more than 34 kPa;

admitting acetone into the chamber 1, which leads to a vaporization of at least some of the acetone, the vapor is precipitated on the surface of the article 4;

allowing the precipitated vapor to act on the article 4 for at least 1 min.;

opening the chamber 1, so that at least the ambient pressure prevails in the chamber 1; and removing the article 4 from the chamber 1.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for smoothing a surface of an article formed at least partially from a plastic, in particular a component of a motor vehicle, comprising:
    arranging the article in a vacuum-tight chamber;
    reducing pressure in the chamber to a partial vacuum to at most 50 kPa;
    admitting acetone into the chamber, wherein at least some of the acetone is vaporized and the acetone vapor is precipitated on a surface of the article;
    allowing the precipitated acetone vapor to act on the article for at least 1 minute;
    opening the chamber so that at least ambient pressure is in the chamber; and
    removing the article from the chamber.

2. The method as claimed in claim 1, wherein the pressure is reduced at most to 34 kPa.

3. The method as claimed in claim 1, wherein the pressure is reduced at most to 40 kPa.

4. The method as claimed in claim 1, wherein when the chamber is opened, excess pressure of at least 2 bar is established in the chamber.

5. The method as claimed in claim 1, wherein the pressure is reduced by sucking air out of an air area of a working chamber.

6. The method as claimed in claim 5, wherein the working chamber further includes an acetone area and a movable divider between the air area and the acetone area to separate the air area and the acetone area, wherein displacement of the movable divider reduces the pressure in the acetone area and the chamber connected thereto.

7. The method as claimed in claim 6, wherein the movable divider is a diaphragm, piston or slide.

8. The method as claimed in claim 1, wherein the acetone is admitted into the chamber through a manifold that is connected to a vessel containing gaseous acetone and liquid acetone.

9. An article having a smoothed surface produced by the method of claim 1.

10. A device for smoothing a surface of an article formed at least partially from a plastic, in particular a component of a motor vehicle, comprising:
    a vacuum tight chamber that is configured to accommodate at least one article to be treated;
    a vessel containing acetone and being connected to the vacuum tight chamber by a feed line having a one-way valve;
    a working chamber comprising an air area and an acetone area linked to the vacuum tight chamber, the working chamber further comprising a displaceable divider operable to separate the air area and the acetone area; and
    a vacuum pump having a suction side connected to the air area.

11. The device as claimed in claim 10, wherein the displaceable divider is a rolling diaphragm, piston, or slide.

12. The device as claimed in claim 10, wherein the vacuum tight is connected to a piping connection having an automatic valve.

13. The device as claimed in claim 10, wherein the vacuum tight chamber is connected to a safety valve having an outlet side that opens into an outlet connection.

14. The device as claimed in claim 13, wherein the safety valve is a one-way valve.

15. The device as claimed in claim 10, wherein the air area is connected to a pipe having a valve.

16. The device as claimed in claim 10, wherein the feed line connecting the vessel to the vacuum tight chamber continues into a manifold disposed in the vacuum tight chamber, the manifold includes openings for acetone vapor to escape.

17. The device as claimed in claim 10, wherein the device further comprises an air connection operable to introduce compressed air into the vacuum tight chamber.

18. The device as claimed in claim 17, wherein the air connection includes an automatic valve operable to open and close a path for the compressed air.

19. The device as claimed in claim 17, wherein a pressure of the compressed air is between 1 bar to 3 bar.

20. The device as claimed in claim 10 further comprising an air outlet connected to the air area.

* * * * *